(12) United States Patent
Andersh et al.

(10) Patent No.: US 7,117,480 B2
(45) Date of Patent: Oct. 3, 2006

(54) REUSABLE SOFTWARE COMPONENTS FOR INVOKING COMPUTATIONAL MODELS

(75) Inventors: Jonathan R. Andersh, Minneapolis, MN (US); Elisa J. Collins, Oakdale, MN (US); Stephen D. Herbert, White Bear Lake, MN (US); Lee W. Houck, Woodbury, MN (US); Mehmet F. Kinoglu, North Oaks, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 681 days.

(21) Appl. No.: 09/995,301

(22) Filed: Nov. 27, 2001

(65) Prior Publication Data

US 2003/0100972 A1 May 29, 2003

(51) Int. Cl.
*G06F 9/45* (2006.01)
(52) U.S. Cl. ....................................... 717/120
(58) Field of Classification Search ................ 717/120; 707/103 R, 14
See application file for complete search history.

(56) References Cited

U.S. PATENT DOCUMENTS

| | | | |
|---|---|---|---|
| 5,229,948 A | | 7/1993 | Wei et al. |
| 5,398,336 A | * | 3/1995 | Tantry et al. ............ 707/103 R |
| 5,826,065 A | | 10/1998 | Hinsberg, III et al. |
| 5,881,270 A | | 3/1999 | Worthington et al. |
| 5,917,730 A | | 6/1999 | Rittie et al. |
| 6,053,947 A | * | 4/2000 | Parson ........................ 703/14 |
| 6,347,256 B1 | * | 2/2002 | Smirnov et al. ............ 700/100 |
| 2002/0077842 A1 | * | 6/2002 | Charisius et al. ............... 705/1 |

FOREIGN PATENT DOCUMENTS

| WO | WO 96/22575 | 7/1996 |
|---|---|---|
| WO | WO 99/60497 | 11/1999 |

OTHER PUBLICATIONS

Linden, Just Java and Beyond, 3rd Ed., 1998, Sun Microsystems Press, p. 30-31.*
Weisert et al., Que's Computer Programmer's Dictionary, 1993, p. 285.*
Fryer, Microsoft Press Computer Dictionary, 1997, p. 175, 311, 437.*
Rogers, P. et al., "A Stimulation Testbed For Comparing The Performance of Alternative Control Architectures", *Proceedings of the 1997 Winter Simulation Conference*, Atlanta, Dec. 7-10, 1997, New York, pp. 880-887.
*Aspen IQ*™, Brochure, Aspen Tech®, 1998, "Powerful Inferential Sensor Modeling and Implementation Package".
Gensym Corporation, G2 Expert Manufacturing, 2000.
Gensym Corporation, NeurOn-Line, 2000.

* cited by examiner

*Primary Examiner*—John Chavis
(74) *Attorney, Agent, or Firm*—Brian Szymanski; Steven A. Bern

(57) ABSTRACT

In general, the invention is directed to a system of reusable software components that allow computational models to be seamlessly integrated into an executable software program, such as process management software within a manufacturing facility. The system includes a set of objects that encapsulate computational models and provide generic interfaces for invoking the models. A control module is embedded within the software program to invoke the computational models in parallel. The system may further include a model aggregator to receive input values from the control module and to distribute the input values to the objects for use during model execution. The system can be used to quickly and easily provide the results of one or more process models to line operators and process engineers during the manufacturing process, allowing the process engineer or line operator to more readily understand and adjust the process.

36 Claims, 7 Drawing Sheets

REUSABLE SOFTWARE COMPONENTS FOR INVOKING COMPUTATIONAL MODELS

TECHNICAL FIELD

The invention relates to computer modeling, such as computer modeling of manufacturing processes.

BACKGROUND

In any industrial manufacturing environment, accurate control of the manufacturing process can be essential. Ineffective process control can lead to products that fail to meet desired yield and quality levels. Furthermore, poor process control can significantly increase costs due to increased raw material usage, labor costs and the like. Accordingly, in an effort to gain improved control of the process, many manufacturers seek to develop computational models or simulations for the manufacturing process. A modeling expert, for example, may develop computational models using a variety of tools and a variety of modeling techniques including, for example, neural networks, linear regression, partial least squares (PLS), principal component analysis, and the like.

However, it is often difficult to effectively transfer the process knowledge produced by these models from the expert studying the model to the process engineers and operators on the manufacturing line. Reports produced by such models may be filed and forgotten, information from presentations and training sessions may not be retained, and process models may be left to languish on the computers of the experts who developed them. Furthermore, computational models are often developed using sophisticated modeling and simulation tools that are often unavailable at the manufacturing line, and are often too cumbersome and complex for use by the line operator.

SUMMARY

In general, the invention provides a system of reusable software modules that allow computational models to be seamlessly integrated directly into the manufacturing process. In particular, the software system encapsulates computational models into reusable objects. Reusable configuration and control modules can be embedded directly within conventional process management software for invoking and controlling the computational models in parallel. Accordingly, the system can be used to quickly and easily provide the results of one or more process models to line operators and process engineers during the manufacturing process, allowing the process engineer or line operator to more readily understand and adjust the manufacturing process.

In one embodiment, the invention is directed to a system in which a set of objects encapsulates computational models and provides generic interfaces for invoking the models. The system further comprises a software program executing within a computer operating environment and having an embedded control module to invoke the computational models in parallel. The system may further include a model aggregator to receive input values from the control module and to distribute the input values to the objects for use during model execution. The model aggregator may store configuration data that maps elements of an input vector to the various inputs of the models. Each element of the vector is referred to herein as an input slot. The configuration data may map an input slot of the model aggregator to multiple inputs of different models, thereby presenting a single interface by which the control module can provide data to, and receive data from, the objects.

In another embodiment, the invention is directed to a computer-readable medium containing instructions. The instructions cause a processor to instantiate a set of objects that encapsulate computational models and that include generic interfaces for invoking the computational models. The instructions further cause the processor to instantiate a model aggregator to distribute input values to the objects and to receive predicted output values from the objects. The instructions cause the processor to instantiate a control module to receive the output values from the model aggregator and to display the output values.

In another embodiment, the invention is directed to a method comprising encapsulating a set of computational models within objects, wherein each object provides a generic interface for invoking the encapsulated computational model. The method further comprises embedding a control module within an executable program, and invoking the set of objects from the control module to execute the computational models in parallel.

The invention may be capable of providing a number of advantages. By making use of the techniques described herein, computational models developed by a modeling expert, for example, can be encapsulated into reusable objects that a process engineer or other user can readily incorporate into an executable software program, such as a process management system within a manufacturing facility. In particular, the line operator, the programmer, and the process engineer need not have detailed knowledge of the models to make use of the models. In this manner, the line operator can execute the computational models directly and conveniently from the plant floor, using the process management software with which he or she is familiar.

The components of the system can be readily arranged as modular, reusable components to promote seamless integration with the executable program. The components may be implemented as, for example, ActiveX™ controls, Java applets, Java Beans™ and the like. Consequently, a user may embed the components within the process management software in a modular manner much in the same way other reusable software controls, such as buttons or text fields are often placed into a program and used.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
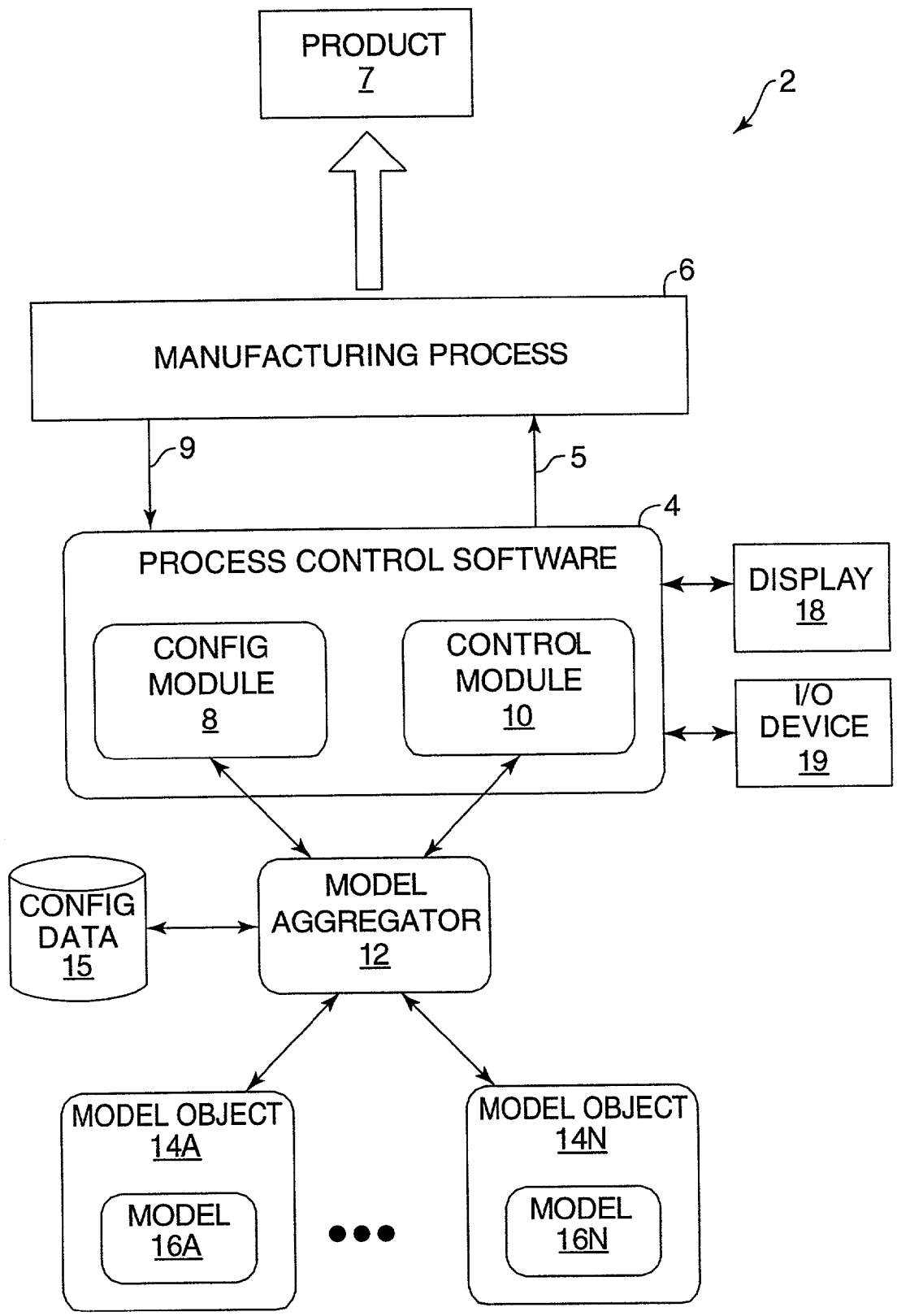
FIG. 1 is a block diagram illustrating an example system in which process management software incorporates reusable software components for seamlessly invoking a plurality of computational models in parallel.

FIG. 1 is a block diagram illustrating an example system 2 in which process management software 4 incorporates reusable software components for seamlessly invoking a plurality of computational models. Although illustrated in reference to process management software, the reusable software components can be incorporated within any executable software program.

In general, process management software 4 executes within a computing environment provided by a computing device, such as a workstation or specific process control hardware. Process management software 4 provides signals 5 to manage manufacturing process 6 in order to produce product 7. Process management software 4 may, for example, provide parameters, thresholds, target levels and other information for use by manufacturing process 6. In addition, process management software 4 may monitor and record process data 9, which may include data indicative of a wide variety of process variables such as temperatures, processing times, speeds, thicknesses, flow rates, concentrations, weights and the like.

Configuration (config) module 8 and control module 10 are embedded within process management software 4 for seamlessly configuring and invoking a plurality of computational models 16 in parallel. In particular, configuration module 8 and control module 10 interact with model aggregator 12, which provides a single interface to a plurality of model objects 14A through 14N, collectively referred to as model objects 14. Each of model objects 14 "encapsulates" a respective computational model 16, and provides a generalized interface for interacting with the encapsulated model 16. In particular, model objects 14 encapsulate computation models 16 by including all of the information necessary to describe and execute computational models 16. Model objects 14 may contain, for example, the parameters, procedures, and algorithms necessary to interpret models 16. In this manner, a separate modeling environment or tool for executing models 16 is not needed. Model object 14 presents a generalized interface, allowing model aggregator 12 to communicate with the encapsulated models 16 in a common manner and format, even though models 16 may be developed using a wide variety of tools and modeling techniques.

Control module 10 invokes and provides input values to model objects 14 in parallel such that the encapsulated computational models 16 provide continuous predictive results. Consequently, model objects 14 and models 16 are not static, stand-alone models disconnected from manufacturing process 7. Rather, control module 10 makes use of the process data 9. In particular, control module 10 may continuously feed process data 9 into model aggregator 12, which distributes process data 9 to model objects 14 as appropriate. Similarly, model objects 14 continuously produce predicted output values as directed by control module 10. Control module 10 presents the predicted output values simultaneously to the line operator via display 18, e.g., in concert with measured data 9. In this manner, the line operator is able to observe predicted output values from a number of models 16 in parallel, along with the actual process data 9 used to feed the models 16. This feature enables the line operator to react more quickly to process events and control the manufacturing process in a more predictable manner.

Control module 10 also allows the line operator to adjust various inputs to the model objects 14 via input/output (I/O) device 19. In particular, as illustrated below, control module 10 may display a number of I/O controls, such as slide bars, toggle switches, or data entry fields by which the line operator can adjust the inputs to models 16. This allows control module 10 to display predicted output values of hypothetical process adjustments from multiple models 16 simultaneously, and in concert with process data 9 and user-provided data.

Configuration module 8 provides mechanisms by which a user, such as a process engineer, can easily select models 16 for encapsulation and parallel execution. In particular, configuration module 8 interacts with display 18 and I/O device 19 to allow the user to browse a computing environment for computational models, and select one or more of the models for encapsulation by model objects 14.

In addition, configuration module 8 allows the user to perform basic configurations for each model 16. Once a model is selected, for example, configuration module 8 displays the model inputs and outputs, and allows the user to set a minimum, maximum and target for each output. In other words, the user can provide configuration data that indicates when measurements from process data 9 fall outside of process specifications.

Furthermore, the user can define a vector for distributing input values to models 16. Each element of the input vector is referred to as an input slot. In particular, the user can define a set of input slots for passing input values to model aggregator 12, and can map the input slots to the various inputs of different models executing in parallel. In this manner, configuration module 8 allows the user to define a mapping between process variables and model inputs. Inputs for more than one model, for example, may be mapped to receive input from a common input slot, and the mapping may be arranged such that some of the input slots distribute input values to a subset of models 16. In other words, the user can develop an aggregate of input slots for distributing the input values to models 16 as appropriate. Model aggregator 12 stores the slot definitions, the mappings, as well as minimum, maximum and target values for each input, within configuration (config) data 15, shown in FIG. 1.

Prior to executing models 16, control module 10 communicates with model aggregator 12 to retrieve configuration data 15. For each output of models 16, control module 10 forms an appropriate output on display 18, such as a graph, that relates the output to the input slots. Control module 10 may determine, for example, the minimum and maximum of the X-axis of a graph based on the specification limits for the input as defined within configuration data 15. Control module 10 may display the outputs of models 16 in parallel by arranging the outputs in matrix form in which the outputs for each model form a row of graphs, and the defined input slots form the columns. Control module 10 may further indicate on each graph whether process data 9 falls within a specified range, as defined by configuration data 15.

Control module 10 and configuration module 8 are designed as modular, reusable software objects implemented according to a component architecture to promote seamless integration with process management software 4. Control module 10 and configuration module 8 may be implemented as, for example, ActiveX™ controls, Java applets, Java Beans™ and the like. Consequently, a user, such as a programmer, may embed control module 10 and configuration module 8 within process management software 4 in a manner much in the same way that other reusable software controls, such as buttons or text fields, are often placed into a program and used. Control module 10 and configuration module 8, however, are multi-featured tools for manipulating models and interacting with them.

Figure 2:
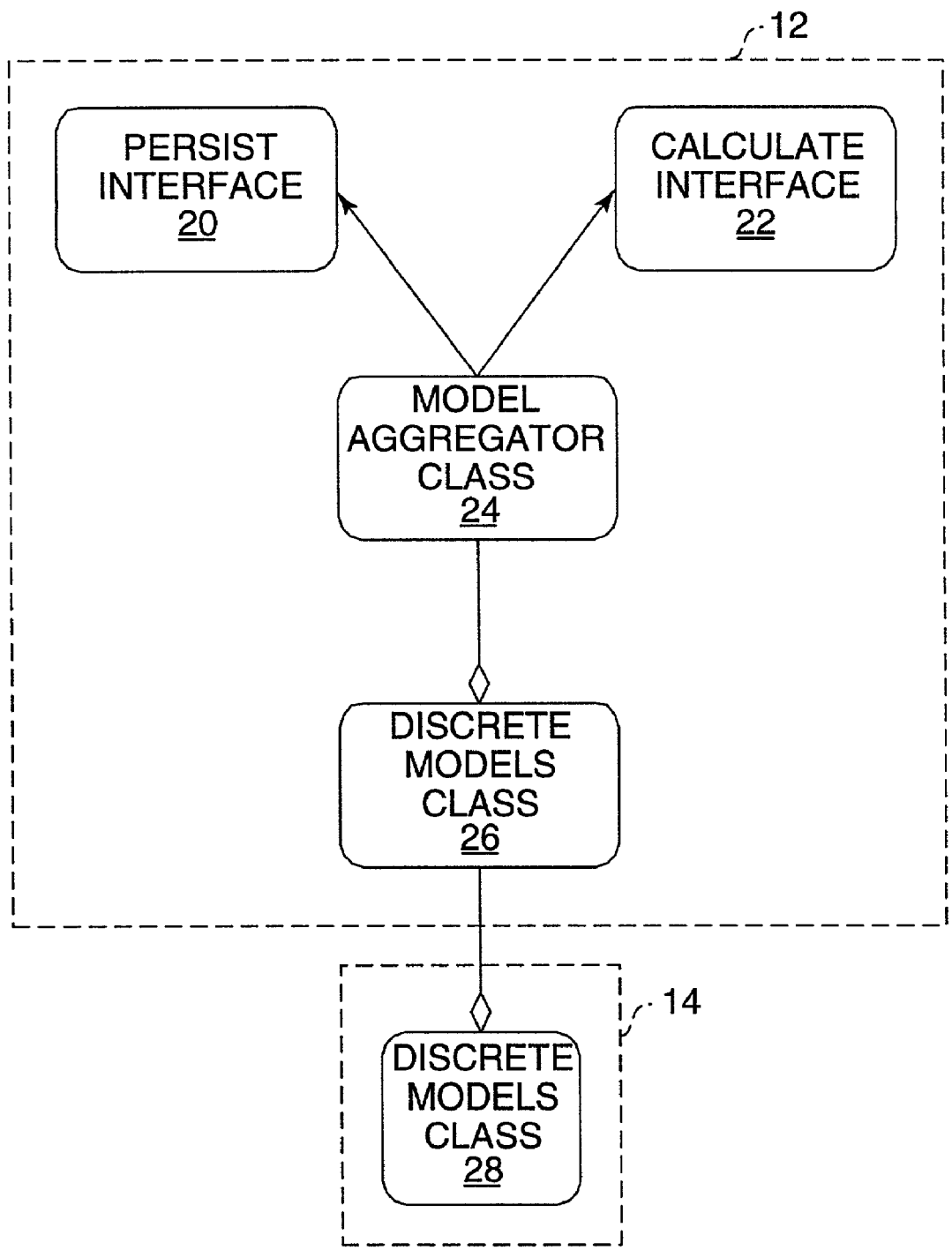
FIG. 2 is an object diagram illustrating exemplary classes and interfaces of the reusable software components.

FIG. 2 is an object diagram illustrating in further detail the classes and interfaces of model aggregator 12 and model objects 14 for seamless execution of a set of computational models in parallel. Model aggregator class 24 is responsible for instantiating existing sets of encapsulated models 16, as well as creating new model sets. The class provides a single point of control for the computational models. Discrete models class 26 maintains an enumerator for each of the models of the set. Discrete model class 28 provides an encapsulated model as well as an interface for invoking the model. In other words, model objects 14 of FIG. 1 represent instantiated objects of discrete model class 28.

Model aggregator 12 provides a persist interface 20 and a calculate interface 22 for communicating with configuration module 8 and control module 10, respectively. More specifically, configuration module 8 interacts with persist interface 20 for encapsulating, configuring and storing models. As an example, persist interface 20 may support the following methods:

| | |
|---|---|
| LoadModelFile | Retrieve a collection of models from a file. |
| GetModels | Retrieve a reference to the set of models used for prediction. |
| AddModel | Add a model to the set of models. |
| SetInputNames | Set the names for the input slots of the set. |
| SetModelMap | Set a mapping between the slots to the models of the set. |
| GetModelMap | Retrieve the input variables specified by the models and arranged according to the currently defined mapping. |
| RemoveModels | Remove all discrete models from the set. |
| RemoveModel | Remove a single, specified model from the set. |

Control module 8 interacts with calculate interface 22 for invoking and updating the contained discrete models 28. As an example, calculate interface 22 may support the following methods:

| | |
|---|---|
| InputCount | Return the number of input variables for a model. |
| ModelCount | Return the number of models within the set. |
| GetModelType | Return the model type for the specified model in the set. |
| GetModelName | Return the model name for the specified model. |
| GetModelNames | Return the model names for the set. |
| GetInVariable | Return the stored configuration information for a given input variable. |
| GetOutVariable | Return the output variable name associated with a specified model. |
| Calculate | Invoke models using one or more sets of input variables. Return the output value(s) |

The discrete model class 28 may support the following methods and public variables:

| | |
|---|---|
| Name | A read/write variable indicating the model name. |
| Type | A string storing the type name of the model. |
| OutVariable | Returns the output variable name for the model. |
| InputCount | Returns the number of input variables associated with the model. |
| MinSpec | Retrieves and sets the minimum desired prediction value. |
| MaxSpec | Retrieves and sets the maximum desired prediction value. |
| GetInputs | Returns an array of input names for the model. |
| GetRange | Returns the minimum and maximum ranges for a given variable. |

Figure 3:
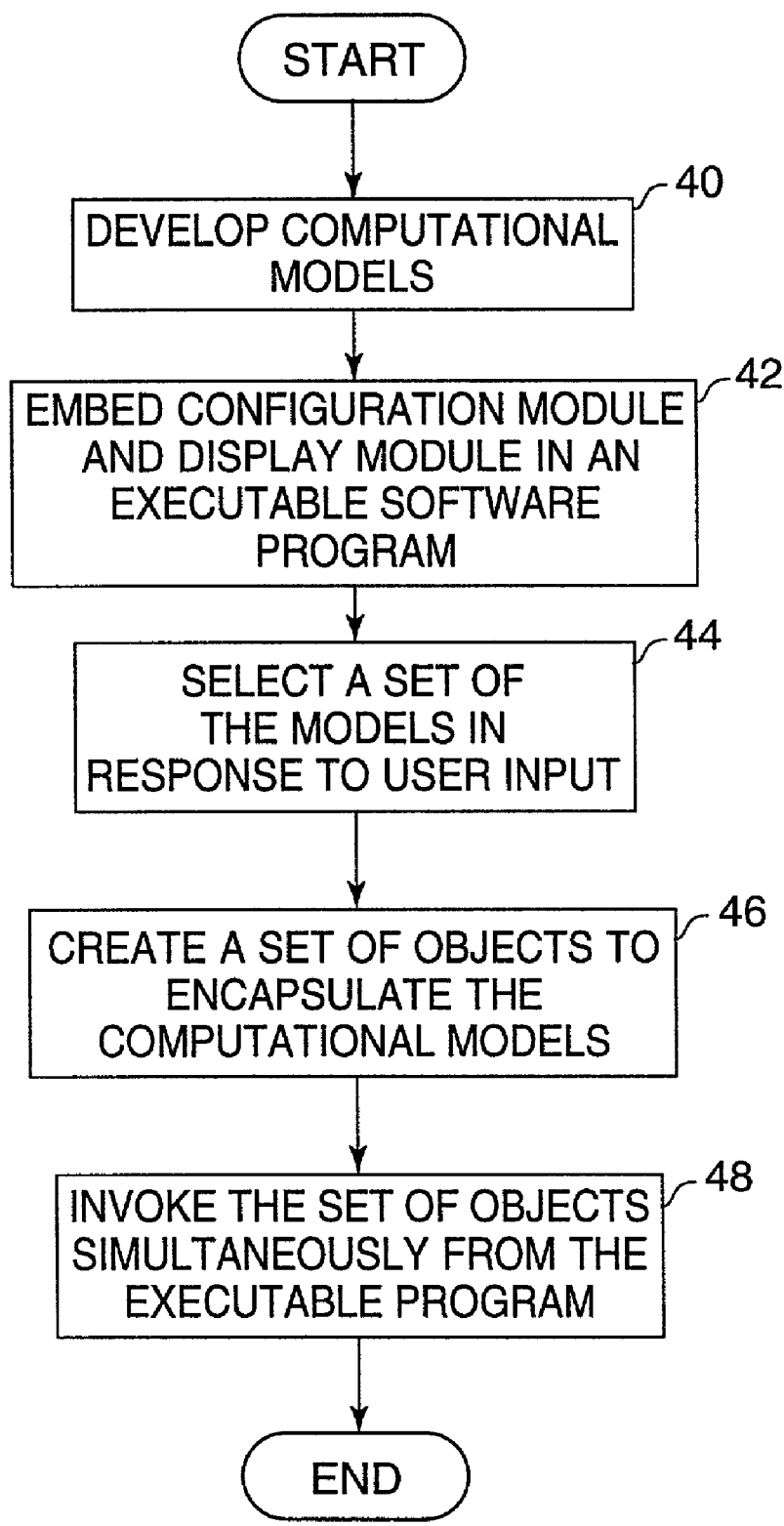
FIG. 3 is a flow chart providing an overview of the operation of the system.

FIG. 3 is a flow chart illustrating the configuration and general operation of the software components of system 2. Initially, one or more users, such as modeling experts, develop computational models 16, possibly using a variety of modeling tools and techniques (40). During this process, the user typically selects a number of input variables that influence the process as well as one or more output variables to be predicted. The user then interacts with a modeling tool, such as MatLab™ by The MathWorks, Inc., of Natick, Mass. or other modeling tool, to develop a computational model that correlates the input variables and the output variables. The tool saves the model in a format that describes the inputs and outputs, as well as corresponding names and ranges. In this manner, the modeling tools may expose properties for the models to facilitate encapsulation, and in conformance with the requirements of modeling objects 14. Alternatively, a translation program may be used to reformat the saved modeling information based on the requirements of modeling objects 14.

Next, a programmer embeds the configuration module 8 and the control module 10 within the process management software 4 (42) as described above. The user, such as the process engineer, then interacts with configuration module 8 via display 18 and I/O device 19 to select one or more computational models to be invoked and executed in parallel from the plant floor (44). For each selected model, configuration module 8 communicates with model aggregator 12 to create and store a corresponding model object 16 that encapsulates the functionality of the model and provides a generalized interface for interacting with the model (46). As described above, model objects 16 may comprise ActiveX™ controls, Java applets, Java Beans™ and the like. Finally, control module 10 communicates with model aggregator 12 to invoke the models in parallel, and to display the predicted results on display 18 simultaneously and integrated within a common user interface (48).

Figure 4:
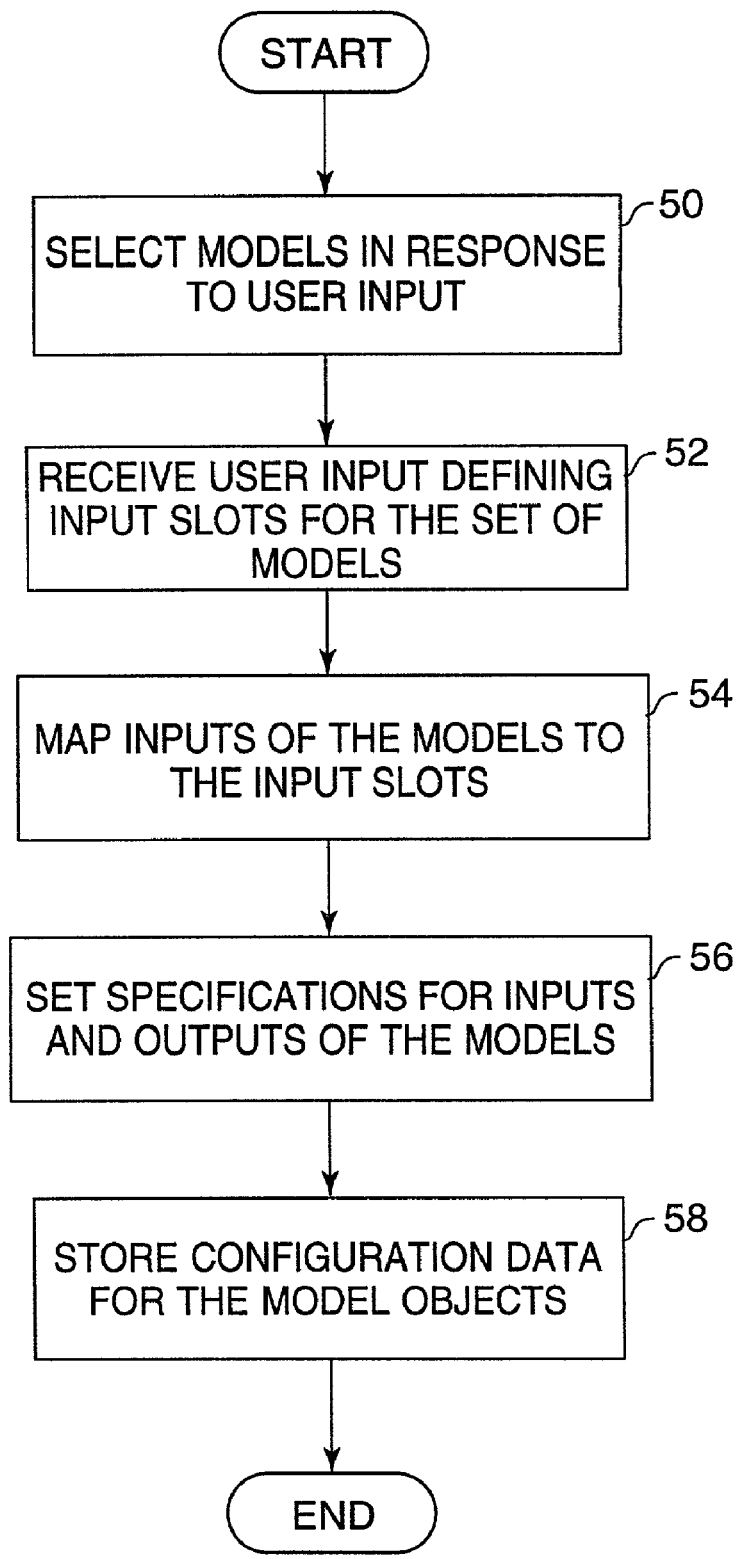
FIG. 4 is a flowchart illustrating a process of creating a set of objects to encapsulate computational models.

FIG. 4 is a flowchart illustrating in further detail the process of creating a set of objects 14 to encapsulate models 16. Initially, a user, such as a process engineer, interacts with configuration module 8 to select one or more computational models (50). Next, the user interacts with configuration module 8 to define one or more high-level input "slots" for the set of models (52). The user may define, for example, a number of different input slots corresponding to process data 9 that is measured from manufacturing process 6.

Next, configuration module 8 allows the user to map the various inputs for each model to the high-level slots (54). The user may, for example, map two or more inputs for the models 16 to receive the same process variable by associating the inputs with the same input slot.

The user may further interact with configuration module 8 to set specifications and targets for the outputs of the model (56). In particular, the user may define maximum and minimum values of a specification range for the output, as well as a target value for the output. Configuration module 8 communicates the configuration data to model aggregator 12 for creating and storing data for a corresponding model object 16 within configuration data 15 (58).

Figure 5:
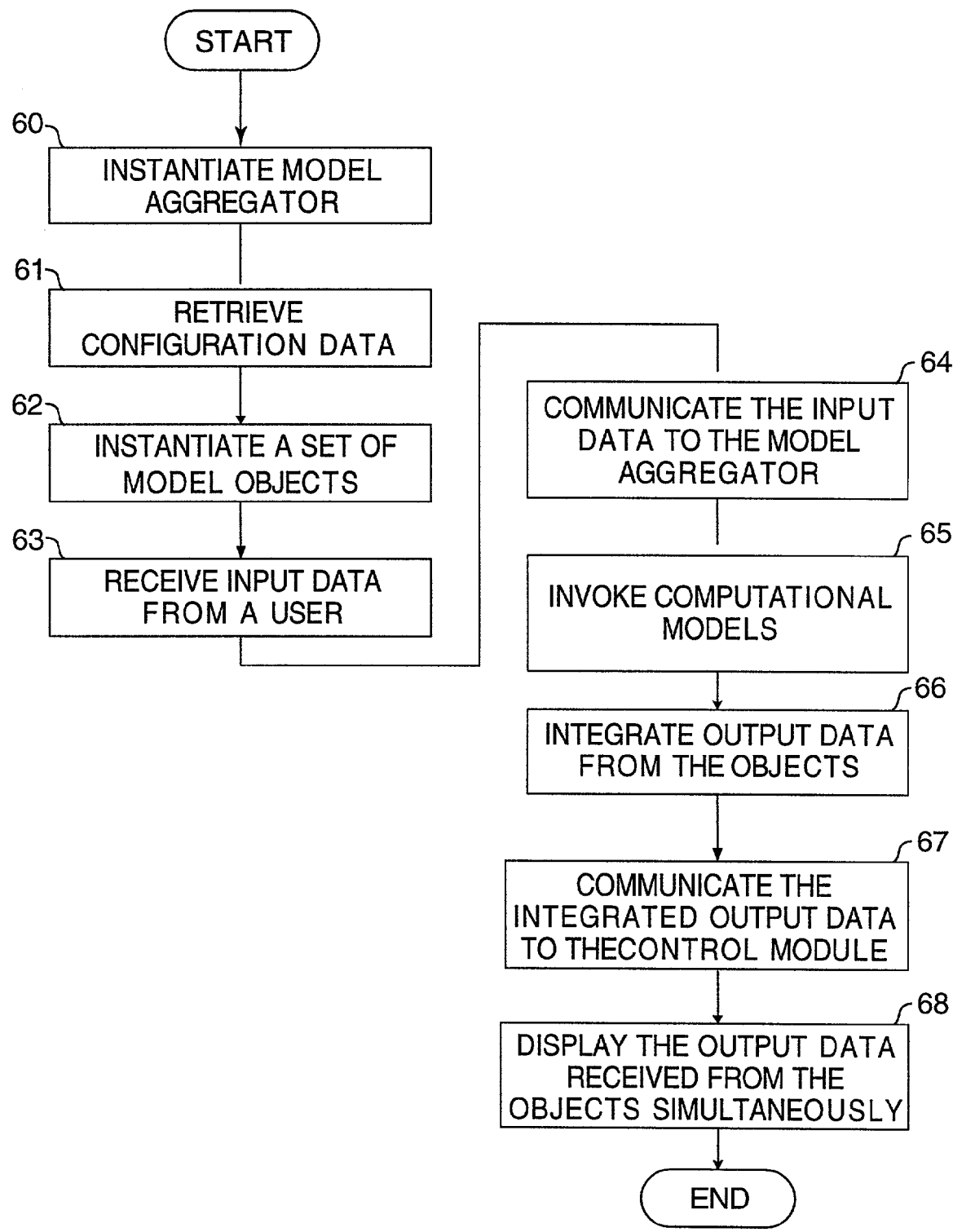
FIG. 5 is a flow chart illustrating operation of the system when invoking the computational models in parallel.

FIG. 5 is a flow chart illustrating the process of invoking computational models 16 in parallel. Upon execution of process management software 4, control module 10 instantiates model aggregator 12 (60) and directs model aggregator 12 to retrieve configuration data 15 defining a set of model objects 14 (61). Based on the retrieved data, model aggregator 12 instantiates a set of model objects 14 each object 14 according to the configuration data 15 (62).

After instantiating model objects 14, control module 10 communicates process data 9 and possibly user-supplied data to model aggregator 12 as input values (63,64), and instructs model aggregator 12 to invoke encapsulated models 16 and return predicted output values (65). Model aggregator 12 integrates the predicted output values from the various model objects 14 (66), and communicates the output to control module 10 (67). Control module 10 presents the output values received from model aggregator 12 on display 18, as well as actual process data 9 and any user-supplied input values (68). In this manner, control module 10 can display predicted output values from multiple computational models simultaneously, and in a manner that is seamlessly integrated with process management software executing on the plant floor.

Figure 6:
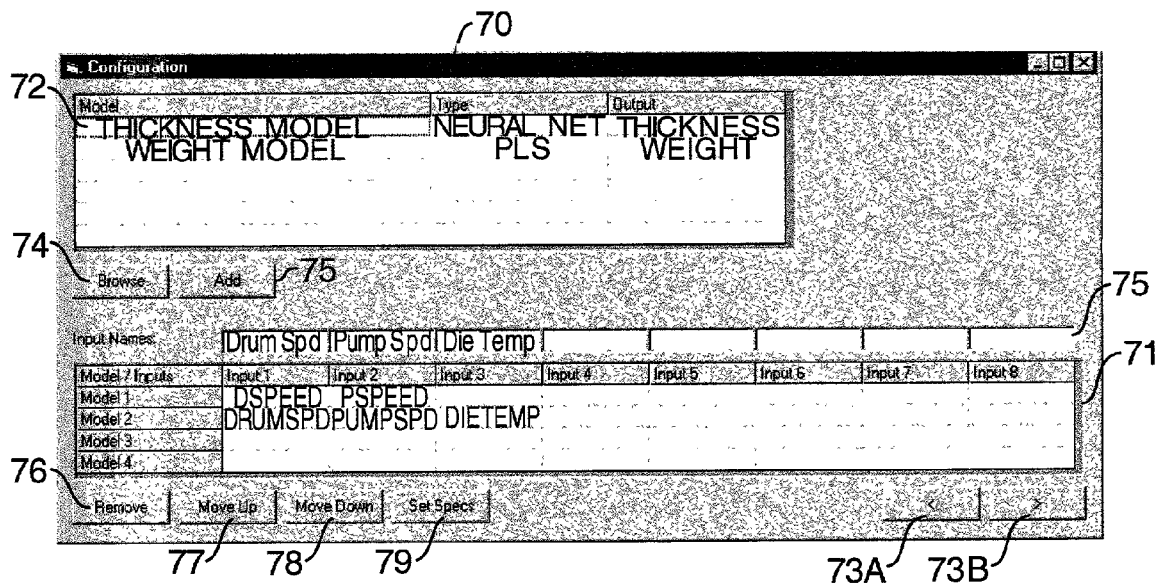
FIG. 6 illustrates an example user interface presented by a configuration module.

FIG. 6 illustrates an example user interface 70 presented by configuration module 8 via display 18. In particular, user interface 70 includes a plurality of model selection fields 72 listing models currently identified by a user, such as a process engineer, as candidate models for encapsulation. In the illustrated example, the user has identified two models: (i) a thickness model implemented as a neural network, and (ii) a weight model implemented using Partial Least Squares (PLS) techniques.

To identify the models, the user can select the BROWSE button 74, causing configuration module 8 to display a dialog box from which the user can select one or more files containing one or more computational models. When the user presses the ADD button 69, configuration module 8 adds the identified model to workspace 71 for configuration. In this manner, the user can identify and selectively add models to the model set.

Configuration module 8 displays each of the selected models along a respective row of workspace 71. The columns of workspace 71 correspond to the defined input slots for model aggregator 12. Configuration module 8 allows the user to map the various inputs for each model to the input slots using reorder buttons 73A,73B. In particular, the user can reorder the inputs for each model to move the inputs to an appropriate column, thereby mapping the inputs to the defined input slots. The user may, for example, map two or more inputs for the models to the same process variable by putting the inputs in the same column of workspace 71. Consequently, even if the inputs have different names within each model, the configuration module 8 can map the inputs to receive input values for the same process variable. Text boxes 75 allow the user to define labels for the slots for display to the line operator via control module 10.

The user can rearrange the rows of workspace 71 using MOVE UP button 77 and MOVE DOWN button 78. By rearranging the rows, the user can control the placement for the models within a user interface as displayed by control module 10. The user may remove models from workspace 71 by selecting REMOVE button 76.

Figure 7:
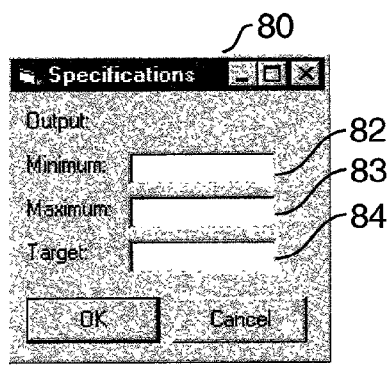
FIG. 7 illustrates another example user interface presented by the configuration module for setting specifications and targets of an output of a selected model.

To set specifications and targets for the outputs of the models, the user selects one of the models within workspace 71 and selects the SET SPECS button 79. FIG. 7 illustrates an example user interface 80 presented by configuration module 8 for setting the specifications and targets for the output of a selected model. In particular, user interface 80 includes data entry fields 82 and 83 for receiving maximum and minimum values of a specification range for the output, as well as data entry field 84 for receiving a target value for the output. Configuration module 8 communicates the data to model aggregator 12 for storage in configuration data 15 for later use by control module 10.

Figure 8:
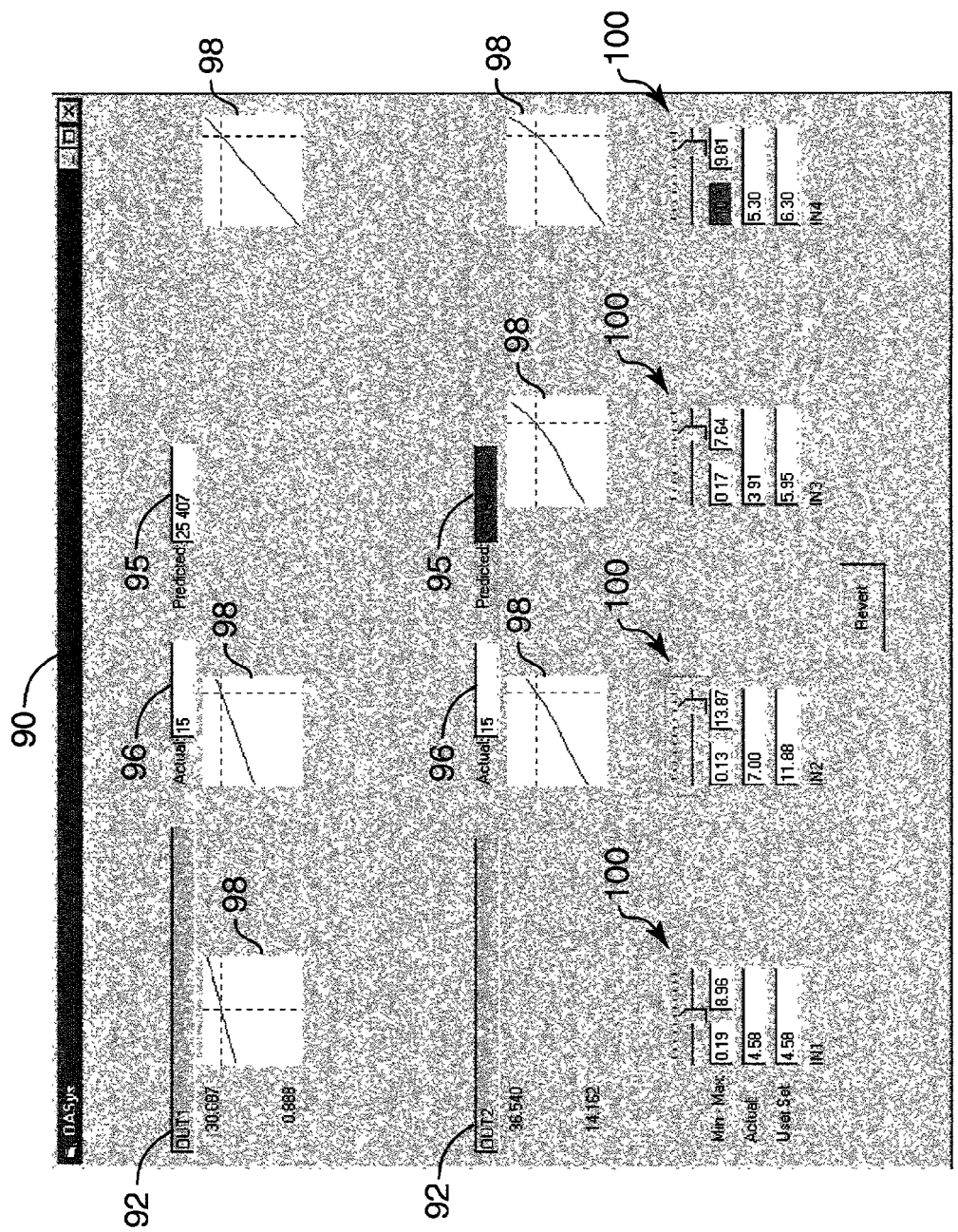
FIG. 8 illustrates an example user interface displayed by a control module.

FIG. 8 illustrates an example user interface 90 produced by control module 10 on display 18. In particular, control module 10 communicates with model aggregator 12 to retrieve configuration data 15 including defined slot names, output variable names, and specified minimums, maximums and targets for the variables. In addition, user interface 90 displays actual process data 9 received from manufacturing process 6.

Specifically, control module 10 displays user interface 90 such that information for models 16 are arranged in matrix format. The outputs of each model 16 form the rows of user interface 90, with the defined input slots for model aggregator 12 forming the columns. As an example, user interface 90 displays outputs 92 from two models 16. In this manner, control module 10 displays outputs from multiple computation models 16 in parallel, and integrated into a common user interface.

For each model 16, user interface 90 displays predicted output values 95 as well as measured process values 96. Control module 10 formats the display of the predicted output values 95 based on the specifications set by configuration module 8. In particular, control module 10 may indicate that a predicted output value 95 has gone outside the specified limits by displaying the predicted output value as red, flashing or similar indicative format.

User interface 90 displays graphs 98 that illustrate the data correlating model inputs and outputs as received. In particular, model objects 14 communicate the data to control module 10 via model aggregator 12. User interface 90 indicates the current operating points, i.e., the points on the graphs that relate to the current input values and output values, by a set of intersecting vertical and horizontal lines.

For each input, user interface 90 provides adjustment mechanisms 100, such as sliders and data entry fields, by which the user can adjust the values provided to the input slots of model aggregator 12. As the user changes the inputs, control module 10 interacts with model aggregator 12 to instruct models 16 to recalculate graphs 98 and predicted output values 95. The user may change the limits for an output by entering the limits within the appropriate data entry fields of adjustment mechanisms 100.

Various embodiments of the invention have been described. These and other embodiments are within the scope of the following claims.

The invention claimed is:

1. A system comprising:
   a set of objects encapsulating respective computational models that simulate a manufacturing process, wherein each of the models receives one or more inputs values and computes one or more predicted output values based on the simulation; and a software program executing within a computer operating environment and having an embedded control module to invoke the computational models in parallel to produce the predicted output values computed by the encapsulated computational models,
wherein the predicted output values are hypothetical adjustments to be made to the manufacturing process.

2. The system of claim 1, further comprising a model aggregator to receive the input values from the control module and to distribute the input values to the objects, wherein at least a portion of the input values correspond to process data measured from the manufacturing process.

3. The system of claim 2, wherein each model includes at least one input and at least one output, and further wherein the model aggregator stores configuration data mapping a set of input slots to the inputs of the models to control distribution of the input values to the objects encapsulating the computational models.

4. The system of claim 3, wherein the configuration data maps a single input slot to multiple inputs of different models.

5. The system of claim 2, wherein the model aggregator receives the predicted output values from the objects executing the encapsulated models in parallel, and communicates the predicted output values to the control module.

6. The system of claim 5, wherein the control module simultaneously displays the predicted output values from the computational models and integrated within a common user interface.

7. The system of claim 1, wherein the control module receives input from a user and communicates the inputs to the object models as inputs to the computational models.

8. The system of claim 1, wherein the software program comprises process management software to manage a manufacturing process.

9. The system of claim 8, wherein the control module receives measured process data and communicates the measured process data to the objects as inputs to the computational models for use in computing the predicted output values.

10. The system of claim 2, further comprising a configuration module to select a set of computational models in response to user input, and to direct the model aggregator automatically to create the set of objects to encapsulate the computational models.

11. The system of claim 10, wherein the configuration module, the control module and the set of objects comprises reusable software components conforming to a software component architecture.

12. The system of claim 1, wherein the objects comprise reusable model software components arranged as one or more dynamic linked libraries (DLLs) invoked by the control module.

13. The system of claim 1, further comprising one or more dynamic linked libraries (DLLs) that implement:
the set of objects;
the control module;
a configuration module invoked by the software program to configure the set of objects in response to user input; and
a model aggregator to receive input values and commands from the control module and to distribute the input values and commands to the objects for invoking the computational models.

14. A system comprising:
a set of objects having generic interfaces for controlling encapsulated computational models;
process management software executing within a computer operating environment to control a manufacturing process, wherein the process management software includes an embedded control module; and
a model aggregator to receive input values and commands from the control module and to distribute the input values and commands to the objects via the generic interfaces,
wherein at least a portion of the input values correspond to process data measured from the manufacturing process,
wherein the control module directs the model aggregator to invoke the computational models in parallel to simulate the manufacturing process and compute predicted output values based on the input values, and
wherein the predicted output values are hypothetical adjustments to be made to the manufacturing process.

15. The system of claim 14, further comprising configuration data mapping a set of N input slots to M inputs of the models, wherein M is greater than or equal to N.

16. The system of claim 14, wherein the control module presents an integrated user interface that simultaneously displays:
(i) the predicted output values received from the model aggregator and generated by the computational models; and
(ii) process data measured from the manufacturing process.

17. The system of claim 14, further comprising a configuration module to select the computational models in response to user input, and to direct the model aggregator to automatically create the set of objects to encapsulate the computational models.

18. The system of claim 17, wherein the configuration module, the control module and the set of objects comprises reusable software components.

19. A computer-readable medium comprising instructions causing a processor to:
instantiate a set of objects encapsulating computational models and including generic interfaces for invoking the computational models, wherein each of the models performs a mathematical simulation of a manufacturing process to compute predicted output values based on input values;
instantiate a model aggregator to distribute input values to the objects and to receive predicted output values computed by the computational models encapsulated within the objects; and
instantiate a control module to receive the output values from the model aggregator and to display the output values, wherein the predicted output values are hypothetical adjustments to be made to the manufacturing process.

20. The computer-readable medium of claim 19, wherein the objects, the model aggregator and the control module comprise reusable components, and further wherein the control module is arranged for embedding within an executable program.

21. The computer-readable medium of claim 20, wherein the objects, the model aggregator and the control module are arranged as dynamic linked libraries (DLLs).

22. The computer-readable medium of claim 19, wherein the instructions further comprise a configuration module to select the computational models in response to user input, and to direct the model aggregator to create the objects encapsulating the models.

23. The computer-readable medium of claim 19, wherein the instructions further comprise an executable software program embedding the control module.

24. The computer-readable medium of claim 23, wherein the executable software program comprises process management software to manage the manufacturing process.

25. A method comprising:
encapsulating a plurality of different computational models within respective objects, wherein each object provides a generic interface for invoking the encapsulated computational model;
embedding a control module within an executable software program; and
invoking the set of objects from the control module to execute the computational models in parallel to simulate a manufacturing process and compute predicted output values based on the simulation, wherein the predicted output values are hypothetical adjustments to be made to the manufacturing process.

26. The method of claim 25, further comprising:
defining a set of input slots; and
mapping inputs of the encapsulated models to the input slots.

27. The method of claim 26, further comprising mapping at least two of the inputs of the models to a common input slot.

28. The method of claim 26, further comprising:
receiving input values from the control module, and distributing the input values to the objects according to the mapping.

29. The method of claim 25, further comprising:
selecting the models in response to user input; and
creating one of the objects for each of the selected models.

30. The method of claim 25, wherein invoking the set of objects comprises:
querying a model aggregator to identify the objects; and
directing the model aggregator to provide input values to and receive predictive output values from the interfaces of the objects.

31. The method of claim 25, further comprising:
receiving measured data from a manufacturing process; and
communicating the measured data to the objects for use during model execution in computing the predicted output values.

32. The method of claim 25, further comprising:
receiving an input value from a user; and
directing the input value to the appropriate objects for use during model execution.

33. The method of claim 25, further comprising:
receiving predictive output values from the objects; and
presenting the predictive output values to a user.

34. The method of claim 33, further comprising presenting the output values simultaneously and integrated within a common user interface.

35. The system of claim 1, wherein the predicted values include one or more of a temperature, a processing time, a speed, a thickness, a flow rate, or a concentration for the manufacturing process.

36. A system comprising:
a set of objects encapsulating respective computational models that simulate a manufacturing process, wherein each of the models receives one or more inputs values and computes one or more predicted output values based on the simulation; and
a software program executing within a computer operating environment and having an embedded control module to invoke the computational models in parallel to produce the predicted output values computed by the encapsulated computational models,
wherein the computational models compute the predicted output values by one or more of neural networks, linear regression, partial least squares (PLS), or principal component analysis.

* * * * *